United States Patent
Brinker et al.

[11] Patent Number: 5,873,001
[45] Date of Patent: Feb. 16, 1999

[54] METHOD FOR RAPID EXPANSION OF MULTI-BYTE SORTING WEIGHTS TABLE TO INCLUDE USER SUPPLIED SORTING WEIGHTS

[75] Inventors: Michael Jonathan Brinker; Patrick Leo Glenski; Katherine Klein Richardson, all of Rochester, Minn.

[73] Assignee: International Business Machines Corporation, Armonk, N.Y.

[21] Appl. No.: 843,630

[22] Filed: Apr. 10, 1997

[51] Int. Cl.[6] ................................................ G06F 7/06
[52] U.S. Cl. ................ 395/898; 707/7; 707/102
[58] Field of Search ................................ 395/898, 899; 707/7, 100, 101, 102

[56] References Cited

U.S. PATENT DOCUMENTS

| | | | |
|---|---|---|---|
| 4,611,280 | 9/1986 | Linderman | 395/898 |
| 4,873,625 | 10/1989 | Archer et al. | 707/7 |
| 5,175,810 | 12/1992 | Young et al. | 707/509 |
| 5,675,818 | 10/1997 | Kennedy | 707/7 |

*Primary Examiner*—Richard L. Ellis
*Attorney, Agent, or Firm*—Joan Pennington

[57] ABSTRACT

A method and computer program product are provided for rapid expansion of multibyte sort information. A master table is copied to working table in the system memory. User sort information entries are received and the working table is updated with the received user sort information entries. Then the remaining entries in the working table are updated to sort after the received user sort information entries.

10 Claims, 9 Drawing Sheets

SAMPLE 1 BYTE SORT INFORMATION

SAMPLE 2 BYTE SORT INFORMATION

FIG. 5

SAMPLE USER SORT INFORMATION ENTRIES 500

| CHARACTER CODE POINT | WEIGHT | |
|---|---|---|
| 0041 | 0001 | ← UNIQUE WEIGHT |
| 0042 | 0002 | ← UNIQUE WEIGHT |
| 0043 | 0003 | ← SHARED WEIGHT |
| 0044 | 0003 | ← SHARED WEIGHT |
| 0045 | 0004 | ← UNIQUE WEIGHT |
| 0125 | 0000 | ← UNIQUE WEIGHT |

FIG. 8

TABLE T1 - PASS 1

| CHANGE FLAG | WEIGHT | |
|---|---|---|
| 0 | 0006 | ← INDEX 0 IN TABLE = WEIGHT OF CHARACTER X'0000' |
| 0 | 0001 | |
| 0 | 0002 | |
| * | **** | |
| 1 | 0001 | ← INDEX 0041 IN TABLE = WEIGHT OF CHARACTER X'0041' |
| 1 | 0002 | |

STEP 1 MASTER TABLE
TEMPLATE 600 IN STORAGE

| INDEX | CHANGE FLAG | WEIGHT OF CODE POINT |
|---|---|---|
| 0000 | 0 | 0000 |
| 0001 | 0 | 0001 |
| 0002 | 0 | 0002 |
| 0003 | * | **** |
| 0041 | 0 | 0041 |
| 0042 | 0 | 0042 |
| 0043 | 0 | 0043 |
| 0044 | 0 | 0044 |
| * | 0 | **** |
| * | 0 | **** |
| 0125 | 0 | 0125 |
| * | 0 | |
| * | * | * |
| * | * | * |
| * | * | * |

INDEX 0041 IN TABLE = WEIGHT OF CHARACTER X'0041'

INDEX 0125 IN TABLE = WEIGHT OF CHARACTER X'0125'

STEP 2- USER SORT INFORMATION ENTRIES 500 APPLIED TO WORKING TABLE T1

| INDEX | CHANGE FLAG | WEIGHT OF CODE POINT | |
|---|---|---|---|
| 0000 | 0 | 0000 | ← INDEX 0 IN TABLE = WEIGHT OF CHARACTER X'0000' |
| 0001 | 0 | 0001 | |
| 0002 | 0 | 0002 | |
|  | * | **** | |
| 0041 | 1 | 0001 | ← INDEX 0041 IN TABLE = WEIGHT OF CHARACTER X'0041' |
| 0042 | 1 | 0002 | |
| 0043 | 1 | 0003 | |
| 0044 | 1 | 0003 | |
| 0045 | 1 | 0004 | |
| 0046 | 1 | 0046 | |
|  | * | **** | |
|  | * | **** | INDEX 0080 IN TABLE = WEIGHT OF CHARACTER X'0080' |
| 0080 | 0 | 0080 | |
|  | * | **** | |
| 0125 | 1 | 0000 | ← INDEX 0125 IN TABLE = WEIGHT OF CHARACTER X'0125' |
| 0126 | 0 | 0126 | |
| 0127 | 0 | 0127 | |
| 0128 | 0 | 0128 | ← INDEX 0128 IN TABLE = WEIGHT OF CHARACTER X'0128' |
|  | * | **** | |

FIG. 9

TABLE T1 - PASS 7

| CHANGE FLAG | WEIGHT |
|---|---|
| 0 | 0006 |
| 0 | 0007 |
| 0 | 0002 |
| * | **** |
| 1 | 0001 |
| 1 | 0002 |

INDEX 0 IN TABLE = WEIGHT OF CHARACTER X'0000'

INDEX 0041 IN TABLE = WEIGHT OF CHARACTER X'0041'

FIG. 10

TABLE T1 - PASS 41

| CHANGE FLAG | WEIGHT |
|---|---|
| 0 | 0006 |
| 0 | 0007 |
| 0 | 0008 |
| * | **** |
| 1 | 0001 |
| 1 | 0002 |

INDEX 0 IN TABLE = WEIGHT OF CHARACTER X'0000'

INDEX 0041 IN TABLE = WEIGHT OF CHARACTER X'0041'

FIG. 11

TABLE T1 - PASS 42

| CHANGE FLAG | WEIGHT |
|---|---|
| 0 | 0006 |
| 0 | 0007 |
| 0 | 0008 |
| * | **** |
| 1 | 0001 |
| 1 | 0002 |

INDEX 0 IN TABLE = WEIGHT OF CHARACTER X'0000'

INDEX 0041 IN TABLE = WEIGHT OF CHARACTER X'0041'

FIG. 12

FINAL TABLE T1 USER INPUT APPLIED

| INDEX | CHANGE FLAG | WEIGHT OF CODE POINT | |
|---|---|---|---|
| 0000 | 0 | 0006 | INDEX 0 IN TABLE = WEIGHT OF CHARACTER X'0000' |
| 0001 | 0 | 0007 | |
| 0002 | 0 | 0008 | |
|  | * | **** | |
| 0041 | 1 | 0001 | INDEX 0041 IN TABLE = WEIGHT OF CHARACTER X'0041' IS 0001 |
| 0042 | 1 | 0002 | |
| 0043 | 1 | 0003 | |
| 0044 | 1 | 0003 | |
| 0045 | 1 | 0004 | |
|  | * | **** | INDEX 0080 IN TABLE = WEIGHT OF CHARACTER X'0080' IS 0086 |
|  | * | **** | |
| 0080 | 0 | 0086 | INDEX 0124 IN TABLE = WEIGHT OF CHARACTER X'0125' IS 0125 |
|  | * | **** | |
| 0124 | 0 | 0125 | |
| 0125 | 1 | 0000 | INDEX 0125 IN TABLE = WEIGHT OF CHARACTER X'0125' IS 0000 |
| 0126 | 0 | 0126 | |
| 0127 | 0 | 0127 | INDEX 0128 IN TABLE = WEIGHT OF CHARACTER X'0128' IS 0128 |
| 0128 | 0 | 0128 | |
|  | * | **** | |

FIG. 13

FINAL TABLE T1 CREATED

| INDEX | WEIGHT OF CODE POINT | |
|---|---|---|
| 0000 | 0006 | ← INDEX 0 IN TABLE = WEIGHT OF CHARACTER X'0000' |
| 0001 | 0007 | |
| 0002 | 0008 | |
|  | **** | |
|  |  | INDEX 0041 IN TABLE = |
| 0041 | 0001 | WEIGHT OF CHARACTER X'0041' IS 0001 |
| 0042 | 0002 | |
| 0043 | 0003 | |
| 0044 | 0003 | |
| 0045 | 0004 | INDEX 0080 IN TABLE = |
|  | **** | WEIGHT OF CHARACTER X'0080' IS 0086 |
|  | **** | |
|  | 0086 | INDEX 0124 IN TABLE = |
| 0080 | **** | WEIGHT OF CHARACTER X'0125' IS 0125 |
| 0124 | 0125 | |
| 0125 | 0000 | INDEX 0125 IN TABLE = WEIGHT OF CHARACTER X'0125' IS 0000 |
| 0126 | 0126 | |
| 0127 | 0127 | |
|  |  | INDEX 0128 IN TABLE = |
| 0128 | 0128 | WEIGHT OF CHARACTER X'0128' IS 0128 |
|  | **** | |

5,873,001

METHOD FOR RAPID EXPANSION OF MULTI-BYTE SORTING WEIGHTS TABLE TO INCLUDE USER SUPPLIED SORTING WEIGHTS

FIELD OF THE INVENTION

The present invention relates to the data processing field, and more particularly, relates to a method and computer program product for rapid expansion of byte sort information.

DESCRIPTION OF THE PRIOR ART

A need exists for sorting 2 byte data on a computer without requiring a 128K table permanently assigned to do it. Two byte sort data is used to either sequence data in a file or to compare two fields in a file since in both of these cases the program needs to know if one data value is "less than" the other data value.

The basic information needed to sort 1 byte data is a list of 1 byte hexadecimal codes and the weight you want each code point to have. The average application may only need to sort around 200 characters. Since this number (200) is close to the maximum you can sort in a 1 byte code of 256 bytes, it is common to just use a whole 256 byte table. Since this table is small (256 bytes), all the data and weights can be stored together. For example, the sort information needed for a 1 byte code can be an array of 256 entries, each entry of 1 byte. Each entry in the array contains the weight associated with that positions code; such as 00 01; 01 02; . . . FE 45; FF 46, as illustrated in FIG. 3. Since you may use several files in an application and if you need to copy this information along with each file, for example, to ensure comparison equality, you will have multiple copies of the information, each copy requiring only 256 bytes and so this is not an issue.

To sort 2 byte data, you need a list of 2 byte hexadecimal codes and the weight you want each to have. To support a 2 byte sort in a manner similar to 1 byte sorts, you would need to supply a list of 65,535 code points along with 65,535 weights. Since the average application may only need to sort around 200 characters you have 65,335 unused places in the table. For example, 2 byte sort information includes 65,535 entries total including 2 byte character code points and 2 byte weights; such as 0000 0001; 0001 0002; . . . FFFE 2121; FFFF 2122, as illustrated in FIG. 4.

This conventional approach takes up 128K of the computer system storage, which is large in size if you are only concerned with sorting 200 characters. The required storage size multiplies quickly if you want to bind the sort information to a data file. Since you may use several files in an application and if you need to copy this information along with each file, for example, to ensure comparison equality, you will have multiple copies of the information, each copy requiring 128K of storage space.

SUMMARY OF THE INVENTION

Important objects of the present invention are to provide an improved method and computer program product for rapid expansion of multibyte sort information; to provide such improved method and computer program product substantially without negative effects and that overcome many disadvantages of prior art arrangements.

In brief, a method and computer program product are provided for rapid expansion of multibyte sort information. A master table is copied to a working table in the system memory. User sort information entries are received and the working table is updated with the received user sort information entries. Then the remaining entries in the working table are updated to sort after the received user sort information entries.

BRIEF DESCRIPTION OF THE DRAWING

The present invention together with the above and other objects and advantages may best be understood from the following detailed description of the preferred embodiments of the invention illustrated in the drawings, wherein:

FIG. 5 is a chart illustrating a sample input or master sort record of the preferred embodiment;

FIG. 6 is a chart illustrating step 1 of a startup table of the method and computer program product of the preferred embodiment;

FIG. 7 is a chart illustrating step 2 of a new table after applying the user input of the method and computer program product of the preferred embodiment;

FIG. 8 is a chart illustrating an updated table after pass 1 of the method and computer program product of the preferred embodiment;

FIG. 9 is a chart illustrating an updated table after pass 7 of the method and computer program product of the preferred embodiment;

FIG. 10 is a chart illustrating an updated table after pass 41 of the method and computer program product of the preferred embodiment;

FIG. 11 is a chart illustrating an updated table after pass 42 of the method and computer program product of the preferred embodiment;

FIG. 12 is a chart illustrating a final table after pass 126 with the user input applied of the method and computer program product of the preferred embodiment;

FIG. 13 is a chart illustrating a final table with the user input applied of the method and computer program product of the preferred embodiment;

DETAILED DESCRIPTION OF THE PREFERRED EMBODIMENTS

Figure 1:
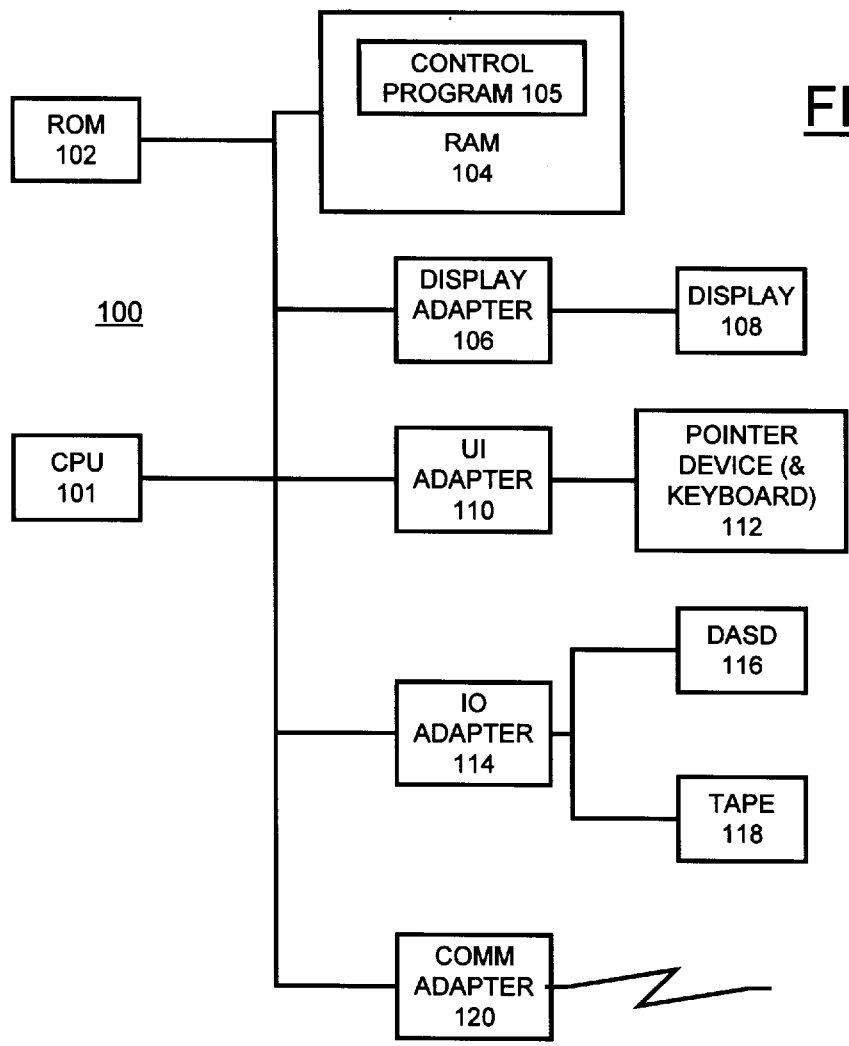
FIG. 1 is a block diagram representation of a computer or data processing system of the preferred embodiment.

Having reference now to the drawings, in FIG. 1 there is shown a computer or data processing system of the preferred embodiment generally designated by the reference character 100. As shown in FIG. 1, computer system 100 includes a central processor unit (CPU) 101, a read only memory 102, a random access memory 104 containing a control program 105, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

Various commercially available processors could be used for computer system 100, for example, an IBM personal computer or similar workstation can be used. Central processor unit 101 is suitably programmed to execute the flowchart of FIG. 2, to generate a master sort record of the preferred embodiment. Control program 105 provides the suitable programming for the central processor unit 101 to perform the method of the preferred embodiment while loading from and storing to the contents of RAM 104, DASD 116 and the tape unit 118, as needed.

In accordance with features of the preferred embodiment, sorting 2 byte data on the computer 100 without needing to have a 128K table permanently assigned to do it is provided using a master sort record to only move around the code points and weights that concern you together with a method to rapidly expand this small set to the full set when you want to do the sort, while ensuring that all the remaining code points, not listed in the user supplied master sort record, sort after the user supplied code points, and in their same respective order. The method of the preferred embodiment is an on the fly method that can expand a master sort record dynamically and is rapidly created without a burden on user storage or system performance.

Figure 2:
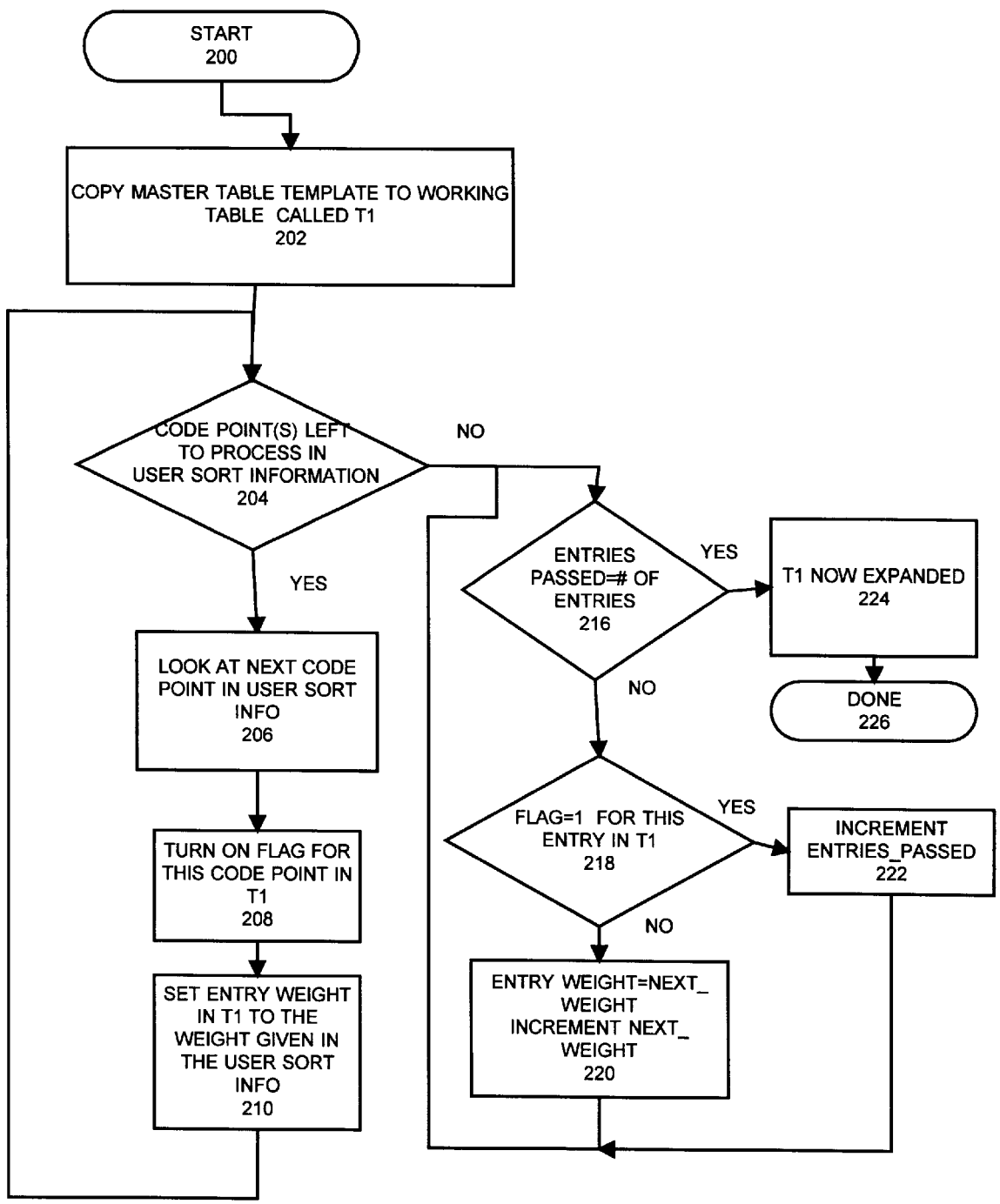
FIG. 2 is a flow chart illustrating the method and computer program product of the preferred embodiment.
Figure 3:
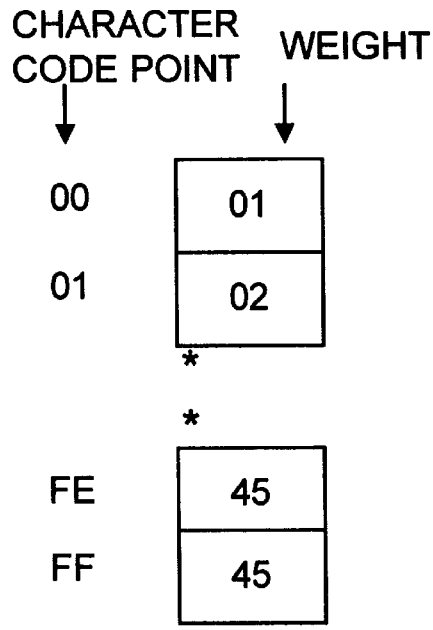
FIG. 3 is a chart illustrating a sample table of 1 byte sort information.
Figure 4:
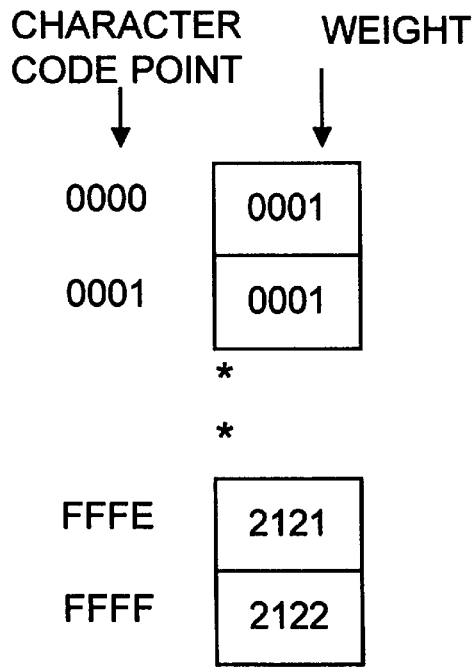
FIG. 4 is a chart illustrating a sample table of 2 byte sort information.

Referring to FIG. 2, there is shown sequential steps for a user application utilizing the control program 105 to create a table containing all of the character code points (in hex) that should be included in the sort. Next to each code point, a weight is added. This weight must start with 0000 and increment sequentially. If the user wants some code points to have a shared weight, then these code points should be given the same weight. A master table template, for example as shown in FIG. 6 and in the following Table 2, is created containing all the character codes in a 2 byte field in hex ascending order with each field preceded by a 1 byte flag that is initially set to 0. The master table is already defined in storage 104, so it only needs to be copied. As indicated at a block 202, a copy of the master table template is obtained and copied into our temporary working table template called T1. Next the working table T1 is updated with the user sort information. Checking for code point(s) left in the user sort information is performed as indicated at a decision block 204. With code point(s) left in the user sort information, a next code point is obtained as indicated at a block 206. For every code point in the user sort information a flag is set (FLAG=1) in the working table T1 using the user code point as the index as indicated at a block 208. A new weight is set in the working table T1 using the user code point as the index for the weight given in the user sort information as indicated at a block 210.

When no more code points are left to process in the user sort information at block 204, then all of the remaining entries in working table T1 need to be updated with a correct weight. As indicated at a decision block 216, the ENTRIES_PASSED is compared with the ENTRIES. When determined at block 216 that the ENTRIES_PASSED is not equal to the ENTRIES, then checking for user FLAG=1 for this entry in working table T1 is performed as indicated at a decision block 218. When user FLAG is not set or FLAG=0, then the NEXT_WEIGHT=is set to ENTRY WEIGHT and NEXT_WEIGHT is incremented as indicated at a block 220. Otherwise, when user FLAG is set, then for each entry until ENTRIES_PASSED=ENTRIES, ENTRIES_PASSED is incremented as indicated at a block 222. When ENTRIES_PASSED is equal to the ENTRIES at block 216, the working table T1 is now expanded and the index containing the Flags is no longer needed and is discarded as indicated at a block 224 and the sequential steps are completed as indicated at block 226.

Referring to FIG. 5, there is shown an example user sort information entries 500 illustrating a user sort record of all the sort code points provided, plus the weights, some unique and some shared and set forth in Table 1 below:

TABLE 1

Example User Sort Information Entries

| |0041|0001| | <— unique weight |
| |0042|0002| | <— unique weight |
| |0043|0002| | <— unique weight |
| |0044|0003| | <— unique weight |
| |0045|0004| | <— unique weight |
| |0125|0000| | <— unique weight |

The user input must be normalized to zero. Normalized means: 1) must be ordered on code points; and 2) weights must start at zero and go up by 1 or 0. The user passes this around as the user sort information 500.

The method of FIG. 2 is performed to merge the user sort information 500 and update the final table illustrated in FIGS. 12 and 13. This method of the preferred embodiment may be understood referring to FIGS. 6–13 for the example user sort information of FIG. 5.

Referring to FIG. 6 illustrating a stored master table template 600 and the following Table 2, notice that the code point is the same as the array index, so we do not need to keep track of it in storage. Also, the weight given to each code point initially is the weight of the code point.

TABLE 2

STEP 1 - WORKING TABLE T1

| T1 index | | |
|---|---|---|
| 0000 | \| 0 \|0000\| | |
| 0001 | \| 0 \|0001\| | |
| 0002 | \| 0 \|0002\| | |
| 0003 | \| . \| . \| | |
| 0041 | \| 0 \|0041\| | <— index 0041 in the |
| 0042 | \| 0 \|0042\| | table = weight of |
| 0043 | \| 0 \|0043\| | character X'0041' |
| 0044 | \| 0 \|0044\| | |
| . | \| 0 \| . \| | |
| . | \| 0 \| . \| | |
| 0125 | \| 0 \|0125\| | <— index 0125 in the |
| . | . . | table = weight of |
| . | . . | character X'0125' |
| . | . . | |

As shown in the following example code, for each entry in the user-defined table, the change flag is set on (FLAG=1) in the working table T1 to indicate that the user has supplied the weight for this character. The weight of the entry code point is changed to the provided weight.

/* Update working table with the user information*/

Do for every Code Point in the user table

Set FLAG=1 in our table using the user code point as the index

Set new weight in our table using the user code point as the index

End

End do

Shown in FIG. 7 and the following table 3 is the new table after applying the sample user input 500.

TABLE 3

STEP 2 - USER INPUT APPLIED

| 0000 | \| 0 \|0000\| | <— index 0 in the table = |
|---|---|---|
| 0001 | \| 0 \|0001\| | weight of character |
| 0002 | \| 0 \|0002\| | X'0000' |

TABLE 3-continued

STEP 2 - USER INPUT APPLIED

```
        . . .
0041  —>  | 1 |0001|    <— index 0041 in the
0042  —>  | 1 |0002|        table = user supplied
0043  —>  | 1 |0003|        weight of character X'0041'
0044  —>  | 1 |0003|
0045  —>  | 1 |0004|
0046      | 0 |0046|
        . . .
        . . .
0080      | 0 |0080|    <— index 0080 in the
        . . .               table = weight of
                            character X'0080'
0125  —>  | 1 |0000|    <— index 0125 in the
0126      | 0 |0126|        table = user supplied
0127      | 0 |0127|        weight of character X'0125'
0128      | 0 |0128|    <— index 0128 in the
        . . .               table = weight of
                            character X'0128'
        . . .
```

As shown in the following exemplary code, now the remaining entries in the working table T1 are updated so that they sort after the user-defined set of characters. To do this, we must keep track of the highest weight used for the user supplied input. Also, user-defined entry weights must be skipped. Since the user input must be normalized to zero, the highest weight used must be less than or equal to the number of user weights provided, so the next available weight is the number of user entries, since the first user provided weight must be zero.

/* Update the remaining entries with the correct weight */
ENTRIES_PASSED=0
NEXT_WEIGHT=ENTRIES
Do the following for each entry until ENTRIES_PASSED=ENTRIES
   If FLAG=0 (not set)
     Set weight=NEXT_WEIGHT
     Increment NEXT_WEIGHT
   Else
     Increment ENTRIES_PASSED
   End do Referring to the following exemplary code and FIG. 8, an example pass 1 is shown where,
ENTRIES_PASSED=0
NEXT_WEIGHT=ENTRIES=6
/* Update the remaining entries with the correct weight */
Do the following for each entry until ENTRIES_PASSED=ENTRIES
   If entry [0].FLAG=0 (not set)
   →Set entry [0].weight=NEXT_WEIGHT (6)
   →Increment NEXT_WEIGHT (7)
   Else
   Increment ENTRIES_PASSED
   End do
/* End of code */

Now the working table will look as shown in FIG. 8 and the following table 4:

TABLE 4

```
—>  | 0 |0006|    <— index 0 in the
    | 0 |0001|        table weight of
    | 0 |0002|        character X'0000'
    | . | . |
    | 0 |0001|    <— index 0041 in the
    | 0 |0002|        table weight of
    . . .             character X'0041'
    . . .
```

The entry at index zero is set to 0006 because it is the first codepoint to follow the six user supplied entries.

FIG. 9 illustrates the updated working table after pass 7. FIG. 10 illustrates the updated table after pass 41. FIG. 11 illustrates the updated working table after pass 42. FIG. 12 illustrates a final table after pass 126 with the user input applied. FIG. 13 illustrates the final table created. As shown in FIG. 13 and table 5, the Flag column is discarded from the working table T1 since it is no longer needed. The result is an array of 65,535 entries, each 2 bytes wide that ensures all the code points not listed sort after the ones given, and in the same respective hexadecimal order.

TABLE 5

FINAL TABLE T1 CREATED

```
|0006|    <— index 0 in the table
|0007|        weight of character
|0008|        X'0000' is 0006
. . .
|0001|    <— index 0041 in the table
|0002|        weight of character
|0003|        X'0041' is 0001
|0003|
|0004|
. .
|0086|    <— index 0080 in the table
. .           weight of character
. .           X'0080' is 0086
|0125|    <— index 0124 in the table
+----+        weight of character
              X'0124' is 0125
|0000|    <— index 0125 in the table
|0126|        weight of character
|0127|        X'0125' is 0000
|0128|    <— index 0128 in the table
+----+        weight of character
. .           X'0128' is 0128
```

Figure 14:
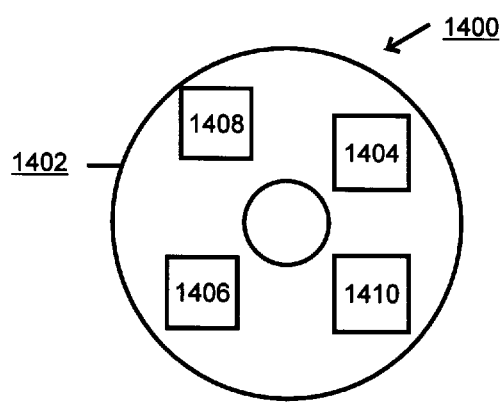
FIG. 14 is a block diagram illustrating a computer program product in accordance with the preferred embodiment.

Referring now to FIG. 14, an article of manufacture or a computer program product 1400 of the invention is illustrated. The computer program product 1400 includes a recording medium 1402, such as, a floppy disk, a high capacity read only memory in the form of an optically read compact disk or CD-ROM, a tape, a transmission type media such as a digital or analog communications link, or a similar computer program product. Recording medium 1402 stores program means 1404, 1406, 1408, 1410 on the medium 1402 for carrying out the method of the preferred embodiment in the system 100 of FIG. 1.

A sequence of program instructions or a logical assembly of one or more interrelated modules defined by the recorded program means 1404, 1406, 1408, 1410, direct the computer system 100 for implementing rapid expansion of 2 byte sort information of the preferred embodiment.

While the present disclosure has been shown to sort double byte character representations, the bytes that are sorted need not represent characters. In fact, the bytes may represent items from any set of meaningful values. The advantage of the present invention excels when the meaningful values are not consecutive. Just as the invention describes a method for sorting 2 byte or double byte datawords, the invention can be applied to sort various multiple byte datawords. The double byte sort utilizes a two byte wide array. Accordingly, a triple byte dataword sort utilizes a three byte wide array. Similarly, this method can be expanded to any n-byte dataword sort.

While the present invention has been described with reference to the details of the embodiments of the invention shown in the drawing, these details are not intended to limit the scope of the invention as claimed in the appended claims.

What is claimed is:

1. A method for rapid expansion of multibyte sort information in a computer system comprising the steps of:

copying a master table to a working table in system memory;

receiving user sort information entries;

updating said working table with said received user sort information entries; and updating remaining entries in said working table to sort after said received user sort information entries.

2. A method for rapid expansion of multibyte sort information in a computer system as recited in claim 1 wherein the step of receiving user sort information entries includes the steps of receiving user sort information entries including user supplied weights of characters.

3. A method for rapid expansion of multibyte sort information in a computer system as recited in claim 1 wherein the step of updating said working table with said received user sort information entries includes the step of setting a flag to indicate user code point.

4. A method for rapid expansion of multibyte sort information in a computer system as recited in claim 1 wherein the step of updating said working table with said received user sort information entries includes the step of setting entry weight to user received weight information.

5. A method for rapid expansion of multibyte sort information in a computer system as recited in claim 1 wherein the step of updating remaining entries in said working table to sort after said received user sort information entries includes the step of for each entry checking a flag, and responsive to said flag being set to indicate user code point, incrementing an number of entries passed in said working table.

6. A method for rapid expansion of multibyte sort information in a computer system as recited in claim 5 further includes the step of responsive to said flag not being set to indicate a remaining entry, setting entry weight to a next weight value and incrementing said next weight value.

7. A computer program product for use in a computer system having a central processor for implementing expansion of multibyte sort information, the computer program product comprising:

a recording medium;

means, recorded on the recording medium, for copying a master table to a working table in system memory;

means, recorded on the recording medium, for receiving user sort information entries;

means, recorded on the recording medium, for updating said working table with said received user sort information entries; and means, recorded on the recording medium, for updating remaining entries in said working table to sort after said received user sort information entries.

8. A computer program product for use in a computer system having a central processor for implementing expansion of multibyte sort information as recited in claim 7 wherein said means, recorded on the recording medium, for receiving user sort information entries includes means for receiving user sort information entries including user supplied weights of characters.

9. A computer program product for use in a computer system having a central processor for implementing expansion of multibyte sort information as recited in claim 7 wherein said means, recorded on the recording medium, for updating said working table with said received user sort information entries includes means for setting a flag to indicate user code point, and means for setting entry weight to user received weight information.

10. A computer program product for use in a computer system having a central processor for implementing expansion of multibyte sort information as recited in claim 7 wherein said means, recorded on the recording medium, for updating remaining entries in said working table to sort after said received user sort information entries includes for each entry, means for checking a flag, means responsive to said flag being set to indicate user code point, for incrementing an number of entries passed in said working table and means responsive to said flag not being set to indicate a remaining entry, for setting entry weight to a next weight value and for incrementing said next weight value.

* * * * *